United States Patent
Aalto et al.

(10) Patent No.: US 6,446,836 B1
(45) Date of Patent: Sep. 10, 2002

(54) LOSS-IN-WEIGHT FEEDER CONTROL

(75) Inventors: Pentti Aalto, Nastola (FI); Jan-Peter Björklund, Parainen (FI)

(73) Assignees: Raute Precision Oy, Lahti (FI); Outokumpa Oyj, Espoo (FI)

( * ) Notice: Subject to any disclaimer, the term of this patent is extended or adjusted under 35 U.S.C. 154(b) by 0 days.

(21) Appl. No.: 09/701,037

(22) PCT Filed: May 19, 1999

(86) PCT No.: PCT/FI99/00434

§ 371 (c)(1),
(2), (4) Date: Nov. 21, 2000

(87) PCT Pub. No.: WO99/63310

PCT Pub. Date: Dec. 9, 1999

(30) Foreign Application Priority Data

May 29, 1998 (FI) .................................................. 981211

(51) Int. Cl.[7] .............................................. B67D 5/08
(52) U.S. Cl. .............................. 222/58; 222/1; 222/56
(58) Field of Search ............................. 222/55, 56, 57, 222/58, 77

(56) References Cited

U.S. PATENT DOCUMENTS

| | | | |
|---|---|---|---|
| 3,497,109 A | * 2/1970 | Leach | 222/144.5 |
| 3,966,000 A | 6/1976 | Allen | |
| 4,266,691 A | * 5/1981 | Wolwowicz | 222/77 |
| 4,579,252 A | 4/1986 | Wilson et al. | |
| 4,867,343 A | 9/1989 | Ricciardi et al. | |
| 5,103,401 A | * 4/1992 | Johnson | 364/479 |

FOREIGN PATENT DOCUMENTS

| | | |
|---|---|---|
| DE | 3742229 | 6/1989 |
| FR | 2 572 520 | 10/1984 |

\* cited by examiner

Primary Examiner—Henry C. Yuen
Assistant Examiner—M A Cartagena
(74) Attorney, Agent, or Firm—Connolly Bove Lodge & Hutz, LLP; Larry J. Hume

(57) ABSTRACT

A method and system for feeding particulate matter in a process or similar application uses feed control based on a loss-in-weight measurement scheme. The control signal for the loss-in-weight control system is formed from the sum function of loss-in-weight measurements performed on the weight of a feed unit and a replenishment unit communicating with a continuous or gravitational plug flow.

6 Claims, 1 Drawing Sheet

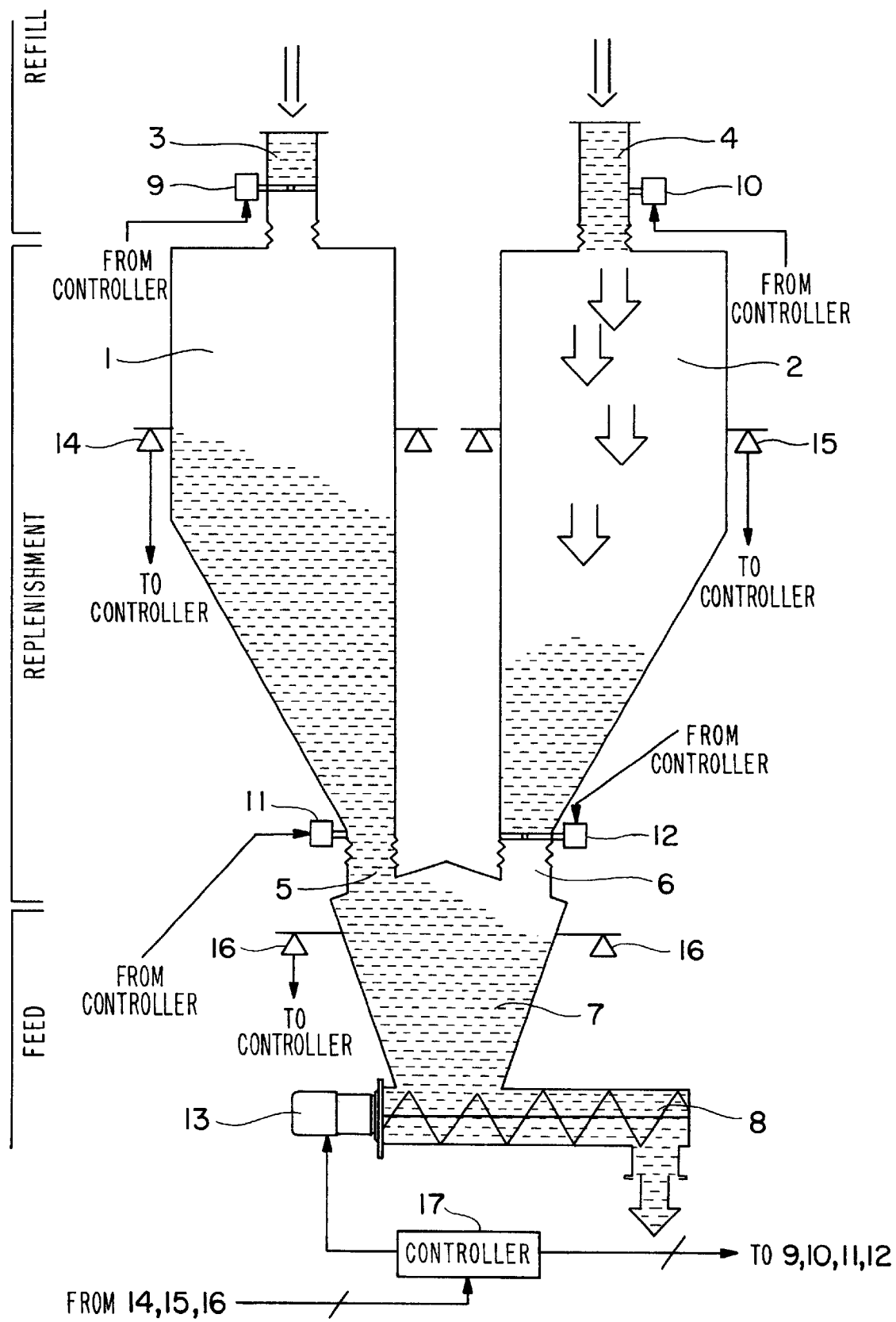

LOSS-IN-WEIGHT FEEDER CONTROL

BACKGROUND OF THE INVENTION

1. Field of the Invention

The present invention relates to a method of feeding fine particulate matter in a continuous manner, e.g., to different kinds of manufacturing processes. In the context of the invention, the term particulate matter is used generally in reference to any bulk particulate material. In a great number of applications, the material is in granular or powderform, whereby its flowing qualities can be improved by fluidization, which is implemented through blowing air into the material.

A system based on the so-called loss-in-weight gravimetric weighing technique is used for the control of the feeding.

2. Discussion of Background Art

The use of loss-in-weight feeding for the above-mentioned purpose is known in the art from different applications. The control system is implemented using equipment in which an essential part is formed by material storage means suspended on weight transducers comprising a so-called weighing bin or bins whose weight can be measured at a desired instant of time. The material flow is passed from such a bin to a feeder constructed to cooperate intimately with said container and having its operation controlled by a measurement signal obtained from the loss-in-weight information of said weighing bin.

A problem herein arises from the refilling of the weighing bin. Continuous operation of the system presumes that the refilling must be performed simultaneously with the discharge of the weighing bin contents for feeding which causes disturbances to the control of the feeder. Consequently, the refill phase is desired to be most instant, and during this time of weight uncertainty, the control system is attempted to be run under different kinds of empirical or computational algorithms. However, said in-evitable uncertain period of weight control remains a persistent problem.

Various solutions have been proposed to this problem, one of them being described in published German patent application Ser. No. 37 42 229. The arrangement disclosed therein is based on a loss-in-weight type of feeder in which the material flow to the feeder is passed via two series-connected weighing bins. The scale of the first weighing bin in the series connection is adapted to monitor the weight changes of this bin only, while the scale of the latter bin monitors the weight changes of the overall system. As a rule, the weight signal of the latter bin scale as such is used in the feeder control except in situations when the first bin is being refilled. In this situation, the control signal is conditioned by subtracting the weight signal of the first scale from the weight signal of the latter scale. Superficially the system operation appears unproblematic notwithstanding its simplifying approaches that inevitably degrade the accuracy of the control. An essential simplification is therein that, during the replenishment transfer of the material from the first weighing bin to the latter, the amount of material dropping between the bins can be known only computationally, not being under control of either scale which gives rise to an uncertainty factor in the control system.

In the art is also known an arrangement in which two feeders with a loss-in-weight control system are connected in parallel. In this configuration the loss-in-weight feeders are refilled alternatingly. Material feed is performed using the feeder which is not in its refill phase. A control arrangement based on the above-described principle is disclosed, e.g., in U.S. Pat. No. 4,579,252. While this arrangement offers a reasonable accuracy of weight control, the overall accuracy is degraded by the weighing errors during the feeder starting phases. The equipment costs of the system are high.

SUMMARY OF THE INVENTION

According to the present invention, in the above-described kind of continuously operating feeder control method in which the control of the material flow is accomplished by gravimetric loss-in-weight measurement of the feed rate and the continuous feed rate is maintained by means of alternating replenishment flows performed under gravimetric material flow measurement, the accuracy of control has been improved by virtue of providing the replenishment and feed phases with weight measurement subsystems operating independently from each other, subjecting the material flow passing via the replenishment and feed phases to realtime weight measurement at least by one of said subsystems and performing the control of the feed rate based on the sum function of the replenishment loss-in-weight signal and the feed loss-in-weight signal.

Advantageously, said realtime continuation of the mate. rial flow during either the replenishment phase or the feed phase performed under weight control is accomplished by arranging the material flow between the replenishment and the feed units to occur as a gravitational plug flow in which the material is passed as a continuous flow from the replenishment unit to the feed unit.

Further advantageously, the feed continuity is assured by performing the replenishment of the feed unit in an alternating manner using a greater number than two of the parallel-operating intercontainer replenishment flows.

DESCRIPTION OF THE DRAWING

In the following, the invention will be described in a greater detail by making reference to the appended drawing in which is shown schematically an embodiment of an apparatus suited for implementing the invention.

DETAILED DESCRIPTION OF THE INVENTION

The apparatus firstly comprises two replenishment bins 1 and 2, each connected to its own independent weighing equipment 14 and 15. In the following text, the bins are called weighing replenishment bins. The material to be fed is passed into these replenishment bins via tubes 3 and 4 equipped with cutoff valves 9 and 10 of appropriate type. The weighing replenishment bins 1 and 2 are provided with hopper nozzles 5 and 6 for transferring the material to be fed into a weighing feed bin 7 comprised of a bin and weighing system 16. The feeder 8 communicates in a fixed manner with the weighing feed bin and operates under the control of the weighing system of the same.

The nozzles 5 and 6 are connected downstream via a flexible connector to assure independent function of respectively series-connected weighing bins 1 and 7, respectively 2 and 7. In the design and dimensioning of the nozzles, it must be taken into account that a disturbance free operation of the system requires a continuous plug flow in such a manner that the material levels in the weighing feed bin 7 and the weighing replenishment bins 1, 2 respectively connected thereto by said continuous plug flow can be considered to have a contiguous content of material.

The nozzles 5 and 6 are provided in a similar manner with cutoff valves 11 and 12 of appropriate type.

The weighing feed bin 7 is fixed to the feeder 8 which, in the illustrated embodiment, is implemented using a screw feeder. The drive machinery 13 of the feeder is provided with a suitable control 17 permitting the adjustment of the feeder screw speed of rotation to attain the proper feed rate. According to the invention, the feed rate control signal is obtained from the sum function of the loss-in-weight signal of the weighing feed container and the loss-in-weight signal of the weighing replenishment container 1 or 2 concurrently communicating therewith.

The loss-in-weight measurement of the weighing replenishment bins 1 and 2 is used for controlling the feed rate only when the actual replenishment bin has a free flow connection with the weighing feed bin 7 and, respectively, the loss-in-weight measurement of a weighing replenishment bin must be included in the control function over the instants said replenishment bin is in a free flow connection with the weighing feed bin. Herein, measures must be taken to assure that the flow connection to the weighing feed bin is cut off for the weighing replenishment bin being refilled.

In the implementation of the invention, the feeder described herein can be replaced by any equivalent, controllable feeder type such as a belt feeder, compartment feeder, plate feeder, vibrating feeder, etc.

The embodiment of the invention is operated starting from the following initial situation. The feeder 8 is stopped and the material to be fed is flowed via, e.g., the refill nozzle 3 into the weighing replenishment bin 1. The discharge valve 11 of the weighing bin 1 is open, thus allowing the material to flow into the weighing feed bin 7 in order to fill the same. When the weighing replenishment bin 1 is full of material, the refill flow into the container is cut off. During this refilling phase of the replenishment bin 1, the discharge valve 12 of the weighing replenishment bin 2 is kept closed. After these initial steps, the system is ready for use. Next, the feeder 8 is started and its operation is controlled by the sum function of the loss-in-weight signals obtained from the bins 1 and 7 connected to their respective weighing systems 14 and 16. As a supplemental function, the filling of the weighing replenishment bin 2 is carried out.

After the weighing replenishment bin 1 is empty or almost completely empty, the discharge valve 11 thereof is closed and, respectively, the discharge valve 12 of the second weighing replenishment container 2 is opened. Simultaneously with the switchover of the discharge valves open/closed states, the loss-in-weight measurement input signal to the feed control system is switched over from the weighing replenishment bin 1 to the weighing replenishment bin 2, whereby also the control of the feeder 8 is continued based on the sum function of the loss-in-weight signals of bins 2 and 7. Immediately after the discharge valve 12 of the weighing replenishment bin 1 is closed, the next refill to the weighing replenishment bin 1 can be initiated.

The above-described arrangement makes it possible to eliminate the uncertain period of weight control almost completely inasmuch the material being transferred as a plug or continuous flow from the weighing replenishment bins 1 and 2, respectively, the weighing feed bins 7, and practically no material flow in a non-continuous, or loose dropping state can occur. The only instant moment for slightly uncontrolled material flow can occur during the switchingover of the replenishing material flow from bin 1 to bin 2, and vice versa. With a suitable equipment arrangement, this uncertain period of weight control can be cut down to an insignificant factor as well. The disclosed control arrangement presumes that the weighing feed container 7 is kept continuously full. The novel arrangement also reduces the risk of uncontrolled bypass flow through the feeder 8 and decreases the effect of quality variations in the material being fed on the accuracy of control.

What is claimed is:

1. A method for continuously feeding a particulate material to an external process, comprising:

filling, with separate portions of the particulate material, both a first replenishment bin and a weighing feed bin in communication with the first replenishment bin;

flowing the particulate material through the first replenishment bin and the weighing feed bin to the external process using a continuous flow without voids contained in said continuous flow;

summing a loss-in-weight of the first replenishment bin and a loss-in-weight of the weighing feed bin to determine a control signal based upon a combined loss-in-weight of the particulate matter due to the flow of particulate matter to the external process;

controlling a flow rate of the particulate material based upon the control signal;

filling a second replenishment bin with another portion of particulate material;

simultaneously stopping communication between the first replenishment bin and the weighing feed bin, commencing communication between the second replenishment bin and the weighing feed bin, and maintaining the continuous flow from the weighing bin to the external process.

2. The method of claim 1, further comprising determining the control signal based upon summing a loss-in-weight of the second replenishment bin and the loss in weight of the weighing bin after communication between the first replenishment bin and the weighing bin has stopped.

3. The method of claim 2, further comprising refilling the first replenishment bin with a further portion of particulate matter after communication between the first replenishment bin and the weighing bin has stopped.

4. The method of claim 1, further comprising alternating communication with the weighing bin between the first replenishment bin and the second replenishment bin.

5. A system for feeding particulate material, wherein the material is fed in a continuous manner, substantially without voids in a material flow, the system comprising:

a weighing bin containing a quantity of the particulate matter;

a first replenishment bin containing a first portion of the particulate matter and being in controlled communication with the weighing bin through a first valve;

a second replenishment bin containing a second portion of the particulate matter and being in controlled communication with the weighing bin through a second valve;

means for determining a combined loss-in-weight of the weighing bin and first replenishment bin;

a feed motor arranged at an output of the weighing bin; and a controller which provides a control signal to control a feed rate of the feed motor based upon the combined loss-in-weight of the weighing bin and first replenishment bin when the first valve is open and the second valve is closed.

6. The system of claim 5, further comprising means for determining a combined loss-in-weight of the weighing bin and second replenishment bin, wherein the controller provides the control signal to control the feed rate of the feed motor based upon the combined loss-in-weight of the weighing bin and second replenishment bin when the second valve is open and the first valve is closed.

* * * * *

UNITED STATES PATENT AND TRADEMARK OFFICE
CERTIFICATE OF CORRECTION

PATENT NO.      : 6,446,836 B1
DATED           : September 10, 2002
INVENTOR(S)     : Aalto Pentti et al.

It is certified that error appears in the above-identified patent and that said Letters Patent is hereby corrected as shown below:

<u>Title page,</u>
Item [73], Assignees to read:

-- [73]  Assignees:  Raute Precision Oy, Lahti (FI)
                     Outokumpu Oyj, Espoo (FI) --

Signed and Sealed this

Twenty-eighth Day of January, 2003

JAMES E. ROGAN
*Director of the United States Patent and Trademark Office*